(12) United States Patent
Yang et al.

(10) Patent No.: US 9,081,155 B2
(45) Date of Patent: Jul. 14, 2015

(54) BACK POST FOR OPTICAL FIBER CONNECTOR

(71) Applicant: PROTAI PHOTONIC CO., LTD., New Taipei (TW)

(72) Inventors: Jyh-Cherng Yang, Taipei (TW); Yu-Kai Chen, Taipei (TW)

(73) Assignee: Protai Photonic Co., Ltd., New Taipei (TW)

( * ) Notice: Subject to any disclaimer, the term of this patent is extended or adjusted under 35 U.S.C. 154(b) by 0 days.

(21) Appl. No.: 13/913,618

(22) Filed: Jun. 10, 2013

(65) Prior Publication Data

US 2014/0270678 A1    Sep. 18, 2014

(30) Foreign Application Priority Data

Mar. 15, 2013    (TW) .............................. 102109154 U

(51) Int. Cl.
  *G02B 6/38*    (2006.01)
  *G02B 6/36*    (2006.01)
(52) U.S. Cl.
  CPC .................................. *G02B 6/3887* (2013.01)

(58) Field of Classification Search
  CPC ...................................................... G02B 6/3887
  USPC ................................................. 385/69, 86, 87
  See application file for complete search history.

(56) References Cited

U.S. PATENT DOCUMENTS

| 5,418,874 A * | 5/1995 | Carlisle et al. .................. 385/76 |
| 7,314,317 B2 | 1/2008 | Hamasaki et al. |
| 2002/0009354 A1 * | 1/2002 | Nagaya et al. ........... 414/222.07 |

FOREIGN PATENT DOCUMENTS

| TW | I266915 B | 11/2006 |
| TW | M380483 U | 5/2010 |

* cited by examiner

*Primary Examiner* — Ryan Lepisto
(74) *Attorney, Agent, or Firm* — Rosenberg, Klein & Lee

(57) ABSTRACT

A back post for an optical fiber connector according to the present disclosure is made from a main material mixed with an additive material. The main material is selected from the group consisting of poly ether ether ketone (PEEK), polyimide (PI), polyether imide (PEI) and polyether sulfone (PES) and the additive material is carbon fiber or glass fiber, wherein the content of the main material in the back post is from 50% to 95% by weight.

4 Claims, 5 Drawing Sheets

BACK POST FOR OPTICAL FIBER CONNECTOR

CROSS REFERENCE TO RELATED APPLICATION

This application claims the priority benefit of Taiwan Patent Application Serial Number 102109154 filed Mar. 15, 2013, the full disclosure of which is incorporated herein by reference.

BACKGROUND

1. Technical Field

The disclosure relates to a back post for an optical fiber connector; and more particularly, to a plastic back post for an optical fiber connector.

2. Description of the Related Art

Fiber optics has revolutionized communication throughout the world. With the increased used of fiber optics it has become increasingly important to be able to connect and disconnect fiber optic cables from various sources. Two fiber optic cables can be optically coupled so that they are in communication with each other by using connectors and an adapter, thereby putting each fiber optic cable in communication with the other. The connectors are placed on the end of each cable and then plugged into the adapter. The adapter has two openings each one designed to receive a connector.

Referring to FIGS. 1a and 1b, a conventional LC type optical fiber connector 100 has a generally rectangular shape with a square cross section. The connector 100 includes a rectangular hollow housing 110 comprised of a top side-wall 111, a bottom side-wall 112, a right side-wall 113 and a left side-wall 114, wherein the right side-wall 113 is positioned opposite to the left side-wall 114 and connects with the bottom side-wall 112 and the top side-wall 111. A latch 120 is molded into the top side-wall 111 and includes a living hinge 125 which allows the tab 126 to be moved up and down in a direction perpendicular to the central axis 150-150 of the connector 100. The latch 120 includes a pair of protrusions 121 that are positioned on opposing sides of the tab 126. In addition, a ferrule 140 protrudes from a circular opening 116 on the front end of the housing 110. A spring 188 is located within the housing 110 to allow the ferrule 140 to move back and forth through the opening 116. A pair of protrusions 160 is positioned on the right side-wall 113 and left side-wall 114, respectively. A rectangular opening 118 is formed on each of the right side-wall 113 and left side-wall 114. A boot 170 extends from the rear end of the housing 110.

In addition, the connector 100 further includes a ferrule holder 130, a back post 182, a crimping ring 184 and a shrink tube 186, wherein the ferrule holder 130 and back post 182 are located inside the housing 110. The ferrule 140 has one end mounted on the ferrule holder 130. The spring 188 is arranged between the ferrule holder 130 and the back post 182. The spring 188 pushes the ferrule holder 130 forward such that the front end of the ferrule holder 130 is brought into contact with an annular protrusion 117 on inner walls of the housing 110. The ferrule 140 is pushed through the annular protrusion 117 and protrudes from the opening 116 of the housing 110.

In general, the back post 182 is made of metal and processed by lathe or CNC lathe. Since the shape of the back post 182 is complex, the process cost thereof is therefore much high. The reason the back post 182 is made of metal is that Kevlar fiber is commonly used as a strength member in fiber optic cable. The aluminum crimping ring 184 is used to crimp the Kevlar fiber on the back post 182 to prevent the fiber optic cable from detaching from the connector 100 under a pull force. If the back post 182 is not hard enough, the crimping ring 184 will deform the back post 182 and therefore fails to crimp the Kevlar fiber. In view of the above, the conventional back post 182 is made with metal.

Accordingly, there exists a need to provide a solution to solve the aforesaid problems.

SUMMARY

The present disclosure provides a back post for an optical fiber connector.

In one embodiment, the back post according to the present disclosure is made from a main material mixed with an additive material. The main material is selected from the group consisting of poly ether ether ketone (PEEK), polyimide (PI), polyether imide (PEI) and polyether sulfone (PES) and the additive material is carbon fiber or glass fiber, wherein the content of the main material in the back post is from 50% to 95% by weight.

The foregoing, as well as additional objects, features and advantages of the disclosure will be more readily apparent from the following detailed description, which proceeds with reference to the accompanying drawings.

BRIEF DESCRIPTION OF THE DRAWINGS

FIG. 1b is a cross-sectional view of the optical fiber connector of FIG. 1a.

DETAILED DESCRIPTION OF THE PREFERRED EMBODIMENT

Figure 1A:
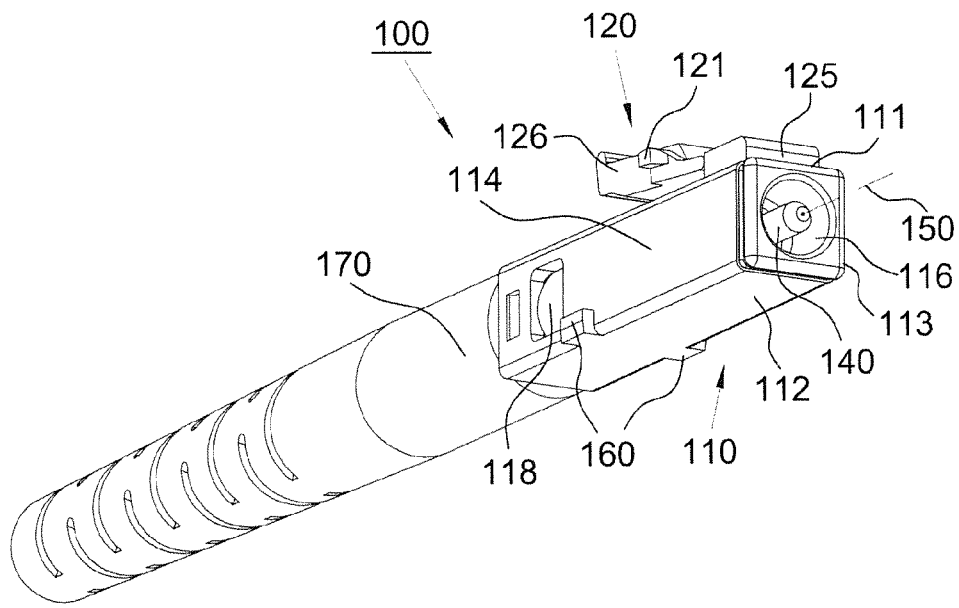
FIG. 1a is an elevated perspective view of a conventional LC type optical fiber connector.
Figure 1B:
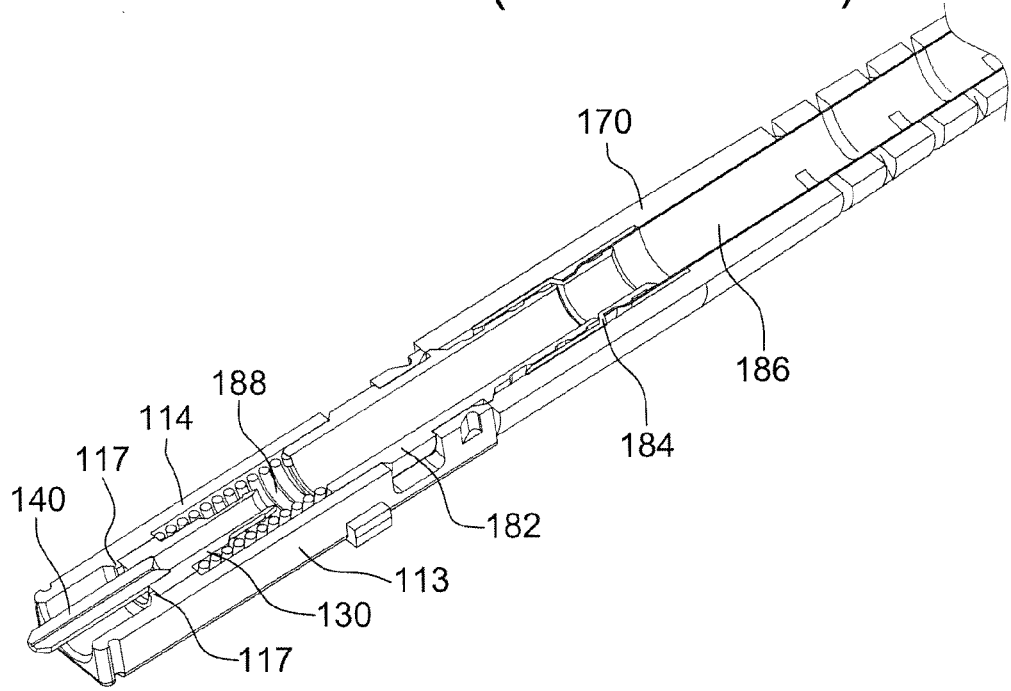

The present disclosure provides a material composition of a back post for an optical fiber connector. For example, the back post may be the hollow back post 182 of the optical fiber connector 100 shown in FIGS. 1a and 1b. The back post of the present disclosure is made from a main material mixed with an additive material. The main material may be a thermoplastic polymer, such as poly ether ether ketone (PEEK), polyimide (PI), polyether imide (PEI) or polyether sulfone (PES), and the additive material may be carbon fiber or glass fiber, wherein the content of the main material in the back post is from 50% to 95% by weight. Preferably, the content of the main material in the back post is 70% by weight.

Figure 2:
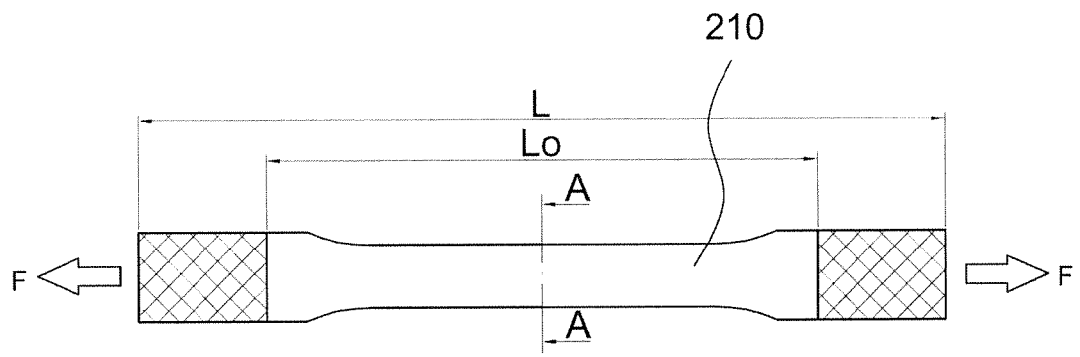
FIG. 2 illustrates how to measure the stress-strain behavior of a sample according to the ASTM D638 standard test method.

In order to test the performance of the back post of the present disclosure, a sample is made from PEEK material mixed with carbon fiber or glass fiber. The testing is performed according to the ASTM D638 standard test method to show the stress-strain diagram of the sample. As shown in FIG. 2, a sample 210 has an initial length $L_0$ and a cross-sectional area A. Under the ASTM D638 standard test method, the initial length $L_0$ is 115 mm. Pull forces F are exerted on two ends of the sample 210. After pulling, the length of the sample 210 has changed to L. Therefore, the stress-strain relations for the sample 210 are defined as follows.

strain($\epsilon$)=$(L-L_0)/L_0$    Formula 1 stress($\sigma$)=$F/A$    Formula 2

Figure 3:
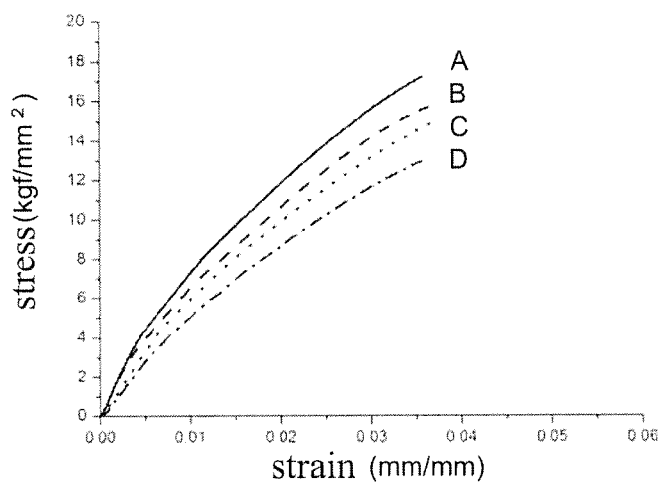
FIG. 3 illustrates the stress-strain behaviors of the samples according to the ASTM D638 standard test method.

The stress-strain behaviors of the samples 210 are illustrated in FIG. 3. The curve A indicates that the sample 210 by weight has 50% PEEK material and 50% carbon fiber. The curve B indicates that the sample 210 by weight has 70% PEEK material and 30% carbon fiber. The curve C indicates that the sample 210 by weight has 80% PEEK material and 20% carbon fiber. The curve D indicates that the sample 210 by weight has 95% PEEK material and 5% carbon fiber.

Afterward, the samples 210 of the present disclosure together with fiber optic cables are used to manufacture the optical fiber connectors 100 to perform tensile tests. According to the IEC 61753-1 and IEC 61300-2-4 standards, the tensile tests are performed in a room-temperature environment and in subjection to 21-time thermal cycles of FIG. 4, respectively to test how large the tensile force will cause the connectors 100 break down. In the tensile tests of the present disclosure, the separation of the back posts 182, the detachment of the crimping rings 184 or the deformation of the latches 120 on the housings 110 of the connectors 100 are all failed.

Test One: Back Posts Made from 70% PEEK Material Mixed with 30% Carbon Fiber

Figure 4:
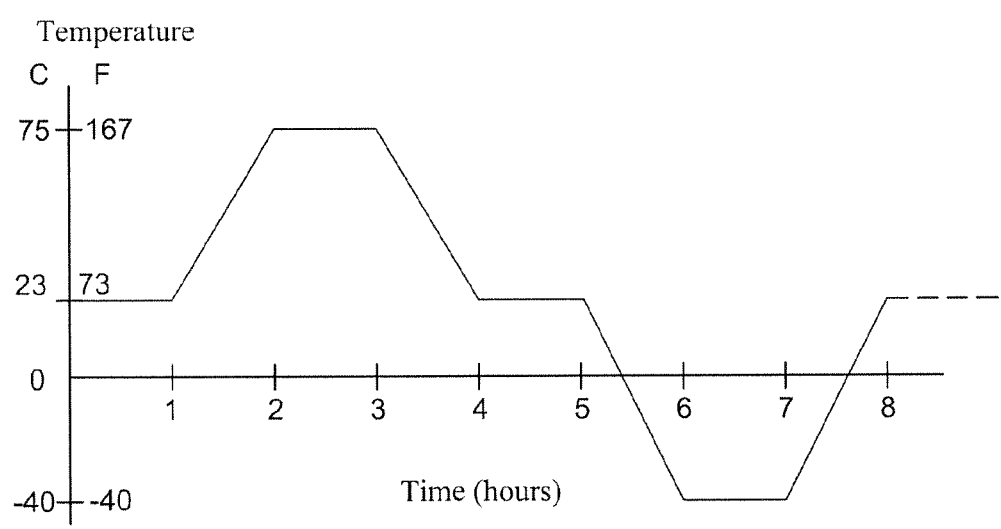
FIG. 4 is a diagram of the thermal cycles defined in the IEC standard.
Figure 5:
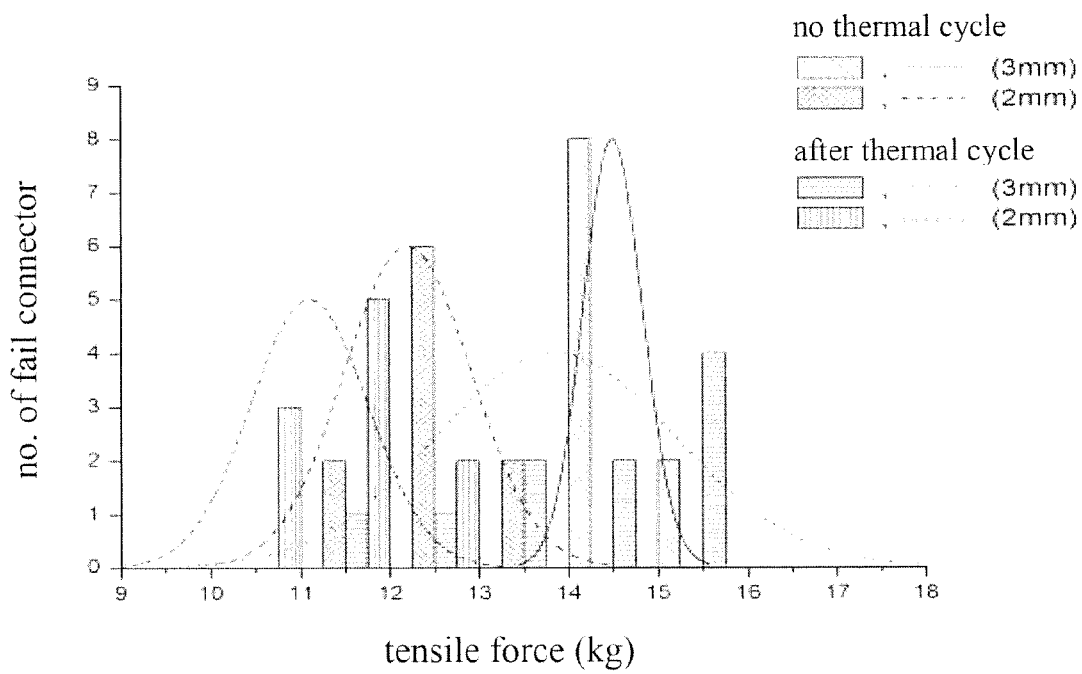
FIG. 5 illustrates the numbers of failed connectors with the back posts in the Test one under the tensile tests with and without subjection to the 21-time thermal cycles of FIG. 4.

Referring to FIG. 5, it illustrates the numbers of failed connectors with the back posts 182 in the Test one under the tensile tests with and without subjection to the 21-time thermal cycles of FIG. 4, respectively. As shown in FIG. 5, without subjection to the 21-time thermal cycles, the connectors with 3 mm diameter fiber optic cables will be all failed when the connectors are subjected to 13.5 to 15.5 kg tensile force, and the connectors with 2 mm diameter fiber optic cables will be all failed when the connectors are subjected to 10 to 14.5 kg tensile force. In subjection to the 21-time thermal cycles, the connectors with 3 mm diameter fiber optic cables will be all failed when the connectors are subjected to 10.5 to 17.5 kg tensile force, and the connectors with 2 mm diameter fiber optic cables will be all failed when the connectors are subjected to 9 to 13 kg tensile force.

Figure 6:
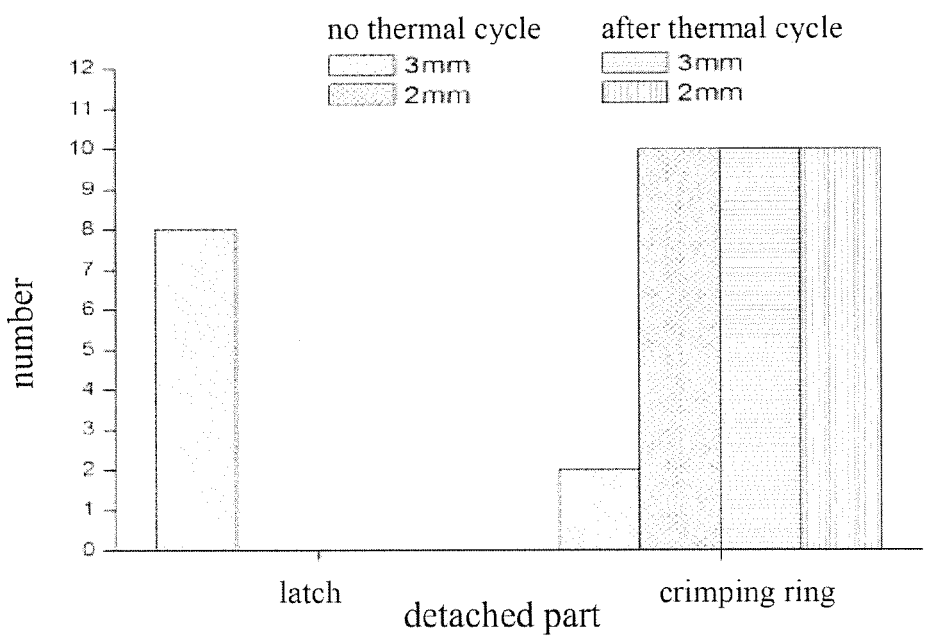
FIG. 6 illustrates which parts detach from the failed connectors of FIG. 5.

Referring to FIG. 6, it illustrates which parts detach from the failed connectors of FIG. 5. As shown in FIG. 6, without subjection to the 21-time thermal cycles, the latches 120 detach from a large portion of the failed connectors with 3 mm diameter fiber optic cables and the crimping rings 184 detach from all of the failed connectors with 2 mm diameter fiber optic cables. In subjection to the 21-time thermal cycles the crimping rings 184 detach from all of the failed connectors with 2 or 3 mm diameter fiber optic cables.

Test Two: Back Posts Made from 70% PEEK Material Mixed with 30% Glass Fiber

Figure 7:
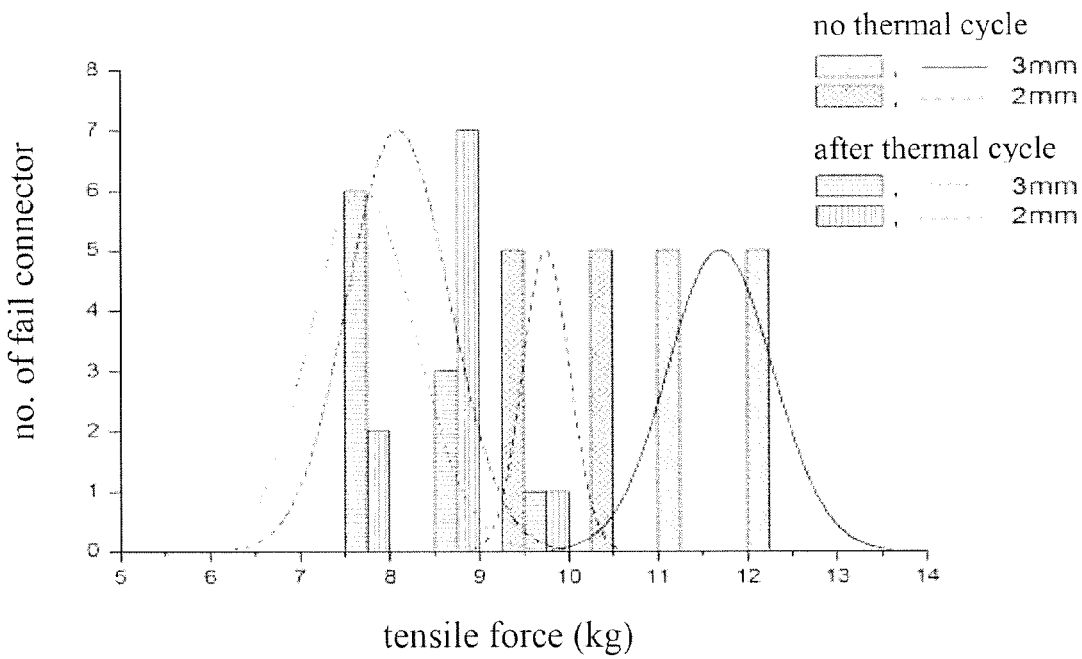
FIG. 7 illustrates the numbers of failed connectors with the back posts in the Test two under the tensile tests with and without subjection to the 21-time thermal cycles of FIG. 4.

Referring to FIG. 7, it illustrates the numbers of failed connectors with the back posts 182 in the Test two under the tensile tests with and without subjection to the 21-time thermal cycles of FIG. 4, respectively. As shown in FIG. 7, without subjection to the 21-time thermal cycles, the connectors with 3 mm diameter fiber optic cables will be all failed when the connectors are subjected to 10 to 13.5 kg tensile force, and the connectors with 2 mm diameter fiber optic cables will be all failed when the connectors are subjected to 9 to 10.5 kg tensile force. In subjection to the 21-time thermal cycles, the connectors with 3 mm diameter fiber optic cables will be all failed when the connectors are subjected to 6 to 9.5 kg tensile force, and the connectors with 2 mm diameter fiber optic cables will be all failed when the connectors are subjected to 6.5 to 10 kg tensile force.

Figure 8:
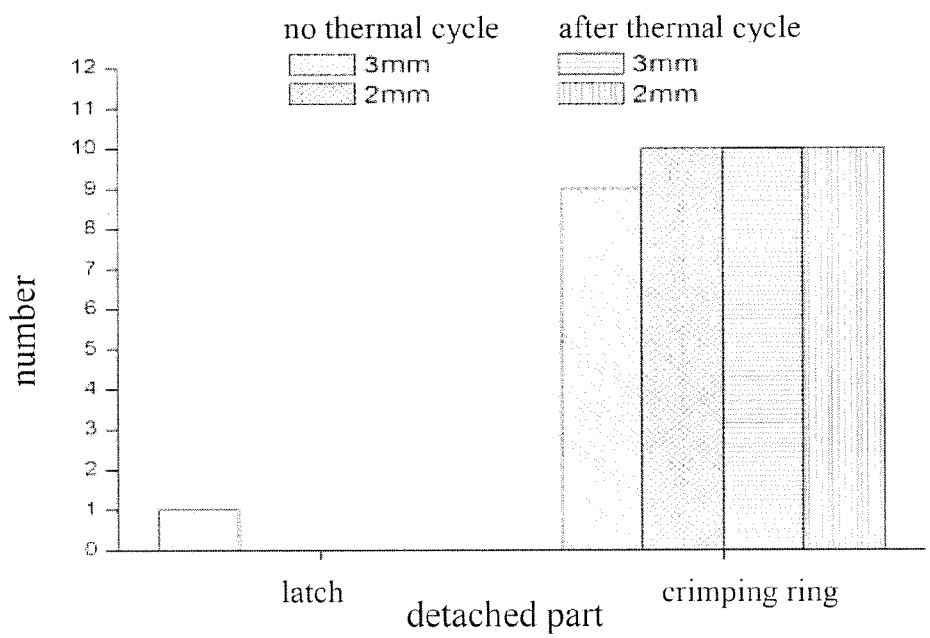
FIG. 8 illustrates which parts detach from the failed connectors of FIG. 7.

Referring to FIG. 8, it illustrates which parts detach from the failed connectors of FIG. 7. As shown in FIG. 6, without subjection to the 21-time thermal cycles, the crimping rings 184 detach from a large portion of the failed connectors with 3 mm diameter fiber optic cables and the crimping rings 184 detach from all of the failed connectors with 2 mm diameter fiber optic cables. In subjection to the 21-time thermal cycles the crimping rings 184 detach from all of the failed connectors with 2 or 3 mm diameter fiber optic cables.

In view of the above test results, the back posts made from 70% PEEK material mixed with 30% carbon fiber or glass fiber are in compliance with the IEC standards and therefore may replace ones made of metal.

We change the weight percentage of the PEEK material in the back posts and perform the same tensile tests. It is verified that the back posts made from 50% to 95% PEEK material mixed with carbon fiber or glass fiber are also in compliance with the IEC standards and therefore may replace ones made of metal.

In addition, we replace the PEEK material with PI, PEI or PES materials and perform the same tensile tests. It is also verified that the back posts made from 50% to 95% PI, PEI or PES materials mixed with carbon fiber or glass fiber are in compliance with the IEC standards and therefore may replace ones made of metal.

It is found that the back posts of the present disclosure made from PEEK, PI, PEI or PES materials mixed with carbon fiber or glass fiber have glass transition temperature (Tg) of 130 to 400° C., and heat deflection temperature (HDT) of 150 to 370° C. under the ASTM D638 standard with a test stress of 1.82 MPa (18.6 kgf/cm$^2$) and a test height of 3.2 mm.

In view of the above, the back posts of the present disclosure are hard enough and may be used together with crimping rings to crimp the Kevlar fiber. Since the back posts of the present disclosure are made mainly from thermoplastic polymer, the back posts may be formed by mold. Accordingly, the production cost of the back posts of the present disclosure is relatively low in comparison with the conventional back posts made with metal.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:
1. A back post for an optical fiber connector, comprising:
a hollow back post having an outer surface overlaid and in direct contact with a Kevlar fiber of a fiber optic cable to be crimped by a crimping ring thereat, wherein the back post includes;
a main material selected from the group consisting of poly ether ether ketone (PEEK), polyimide (PI), and polyether sulfone (PES); and
an additive material mixed with the main material, wherein the additive material is carbon fiber or glass fiber, wherein the content of the main material in the back post is from 50% to 95% by weight.

2. The back post as claimed in claim 1, wherein the content of the main material in the back post is 70% by weight.

3. The back post as claimed in claim 1, wherein the back post has a glass transition temperature of 130 to 400° C.

4. The back post as claimed in claim 1, wherein the back post has a heat deflection temperature of 150 to 370° C.

* * * * *